United States Patent [19]
Dill et al.

[11] 4,211,508
[45] Jul. 8, 1980

[54] EARTH BORING TOOL WITH IMPROVED INSERTS

[75] Inventors: Herbert C. Dill; Stanley R. Scales, both of Houston, Tex.

[73] Assignee: Hughes Tool Company, Houston, Tex.

[21] Appl. No.: 657,990

[22] Filed: Feb. 13, 1976

Related U.S. Application Data

[63] Continuation of Ser. No. 485,658, Jul. 3, 1974, abandoned.

[51] Int. Cl.² ........................... B26D 1/00; B21K 5/02
[52] U.S. Cl. ................................. 407/120; 76/108 A; 175/410
[58] Field of Search ...................... 29/95 R; 76/108 A; 51/313, 316; 175/410; 407/120

[56] References Cited

U.S. PATENT DOCUMENTS 2,978,850  4/1961  Gleszer .................... 51/316
3,651,716  3/1972  Stebley .................. 76/108 A

FOREIGN PATENT DOCUMENTS 855865  12/1960  United Kingdom ...................... 51/316

Primary Examiner—Leonidas Vlachos
Attorney, Agent, or Firm—Robert A. Felsman

[57] ABSTRACT

In an earth boring tool an improved sintered tungsten carbide insert and surface conditioning method to improve retention within an interferringly sized hole and to decrease the frequency of fracture of the inserts. The insert has a randomly varied surface finish that is obtained from abrasive treatment with particles having hardness greater than 9.0 on Mohs' Scale. The particles are selected from the class consisting of silicon carbide, boron carbide, boron, and diamond. The resulting surface has asperities varying from a maximum value, smaller than that formed by grinding, to a minimum value, larger than the mat finish obtained by abrading with aluminum oxide.

2 Claims, 5 Drawing Figures

EARTH BORING TOOL WITH IMPROVED INSERTS

CROSS REFERENCE TO RELATED APPLICATION

This is a continuation of application Ser. No. 485,658, filed July 3, 1974, now abandoned.

BACKGROUND OF THE INVENTION

1. Field of the Invention: This invention relates in general to earth boring tools and in particular to improved tungsten carbide inserts and methods for their manufacture to improve retention in interferringly sized holes and to decrease the frequency of fracture of the inserts.

2. Description of the Prior Art: Earth boring tools include those which have tungsten carbide inserts interferringly retained in mating holes, with protruding ends formed as rock cutting, crushing, chipping or abrading elements. A typical insert is manufactured of sintered tungsten carbide, a composition of mono and/or ditungsten carbide cemented with a binder selected from the iron group, consisting of cobalt, nickel or iron. Cobalt ranging from about 10% to 16%, balance tungsten carbide, is presently the most common binder. The exact composition depends upon the usage intended for the tool and its inserts.

Most of the prior art inserts have round cylindrical surfaces dimensioned to be larger than their mating drilled and reamed holes by a nominal value of about 0.002 inch. For the purpose of improving the surface finish and condition, the inserts are commonly "bright tumbled", meaning that they are tumbled against each other until their surfaces are smoothed to a condition that appears bright or shiny. Also, the inserts have in the past been tumbled in an abrasive medium such as aluminum oxide to produce a "mat" finish, which is relatively smooth but dull in comparison with a "bright" finish.

The smooth, bright and mat finishes were thought to be advantageous in minimizing, during insertion or pressing, the possibility of shearing the metal forming the surface of the interferring hole. Shearing of the retaining surface decreases the pressure exerted against an insert, and may cause loss of the insert during earth boring operations.

Frank E. Stebley in U.S. Pat. No. 3,581,835, issued June 1, 1971, disclosed a generally polygon shaped insert abraded by barrel tumbling in the conventional manner in an abrasive medium that includes aluminum oxide and silicon rock welted with a basar-water solution. Alternatively, the inserts may be grit blasted while set on end in a rubber mat to hasten abrasion. This abrasion is followed by tumbling in an abrasive medium to provide the desired smooth finish. The polygon shape prevents turning and movement of the insert, while the treatment with abrasives rounds the corner surfaces to prevent scraping of the wall of a retaining hole.

SUMMARY OF THE INVENTION

The invention relates to earth boring tools that utilize improved wear resistant sintered tungsten carbide inserts. The improved insert has a randomly varied surface finish obtained with a medium that includes particles having a hardness greater than 9.0 on Mohs' Scale. The preferred particle is boron carbide, which is one of a class of particles consisting of silicon carbide, boron, boron carbide, and diamond, all of which have a hardness greater than 9.0. The resulting surface of the insert has asperities varying from a maximum asperity value, which is smaller than that formed by grinding, to a minimum asperity value, which is larger than the mat finish obtained by abrading with aluminum oxide. The preferred surface treatment produces a surface which in any lineal increment of at least 0.010 inch long, has at least three asperities at least 0.001 inch long and at least 0.00005 inch deep when measured using a stylus point with a 0.0005 inch radius. When assembled in a mating aperture with interference fit, retention is improved and the frequency of insert fracture is lessened.

DESCRIPTION OF THE PREFERRED EMBODIMENT

Figure 1:
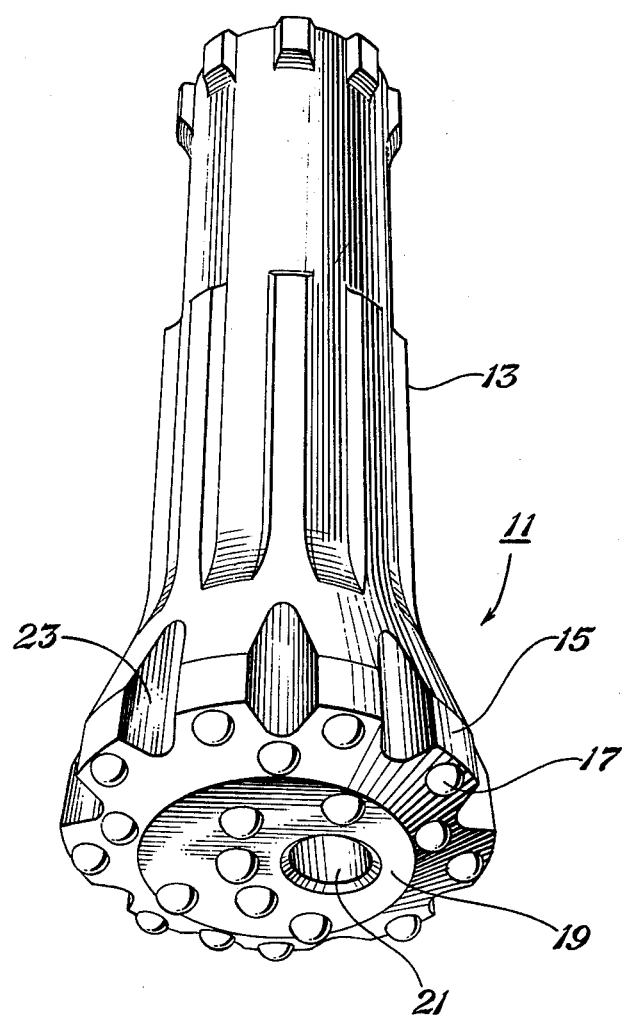
FIG. 1 is a rotary percussion type earth boring drill bit containing improved inserts constructed according to the principles of the invention.

Referring initially to FIG. 1, the numeral 11 designates a rotary percussion earth boring drill bit having a typical splined shank 13 on its upper end. An enlarged lower region 15 has a plurality of sintered tungsten carbide inserts 17 secured by interference fit in mating holes drilled in selected locations in a transverse face 19. An air course 21 and return flow slots 23 on the outer periphery of the enlarged region 15 flush earth cuttings from the bottom of the bore hole.

Figure 2:
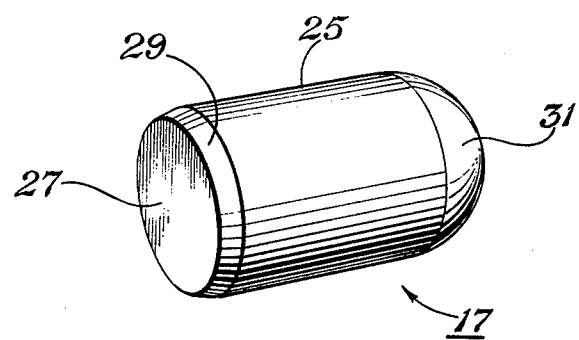
FIG. 2 is a perspective view of a sintered tungsten carbide insert of the type used in the drill bit of FIG. 1.

An insert to which the invention is applied is shown in FIG. 2. A typical geometrical configuration is illustrated for this insert 17, including a cylindrical wall surface 25, perpendicular end 27 with a bevel 29, and a hemispherical end 31. The preferred metallurgical composition is sintered tungsten carbide having about 12% cobalt by weight, the balance being essentially monotungsten carbide. The bevel 29, as seen in longitudinal cross section, forms a preferred angle of about 15° with wall surface 25. Such constructions and composition are common in the prior art. Other insert shapes are within the scope of the invention.

The drilled holes that receive the inserts are typically reamed in the prior art percussion bit and may have a surface finish of about 125 R.M.S. The bit may be formed from A.M.S. 6418 alloy steel, quench and tempered to produce a hardness in a range from about 37 to 44 Rockwell "C". These treatments and conditions are also known in the prior art.

The present invention is obtained by a method that utilizes inserts 17 that have been ground initially, and subsequently slurry tumbled in a barrel tumbler containing particles of boron carbide and water. A majority of the particles are preferably 100 to 325 mesh, ideally 230 mesh, the mesh standard being that established by the United States Bureau of Standards. The inserts are tumbled with these particles from about one half to two hours, ideally for about one hour. Then the inserts are pressed into the previously described drilled and reamed holes with a nominal interference of about 0.002 inch. Tolerances of the inserts and drilled holes enable the interference to vary normally in a range from about 0.001 to 0.0028 inch.

Figure 4:
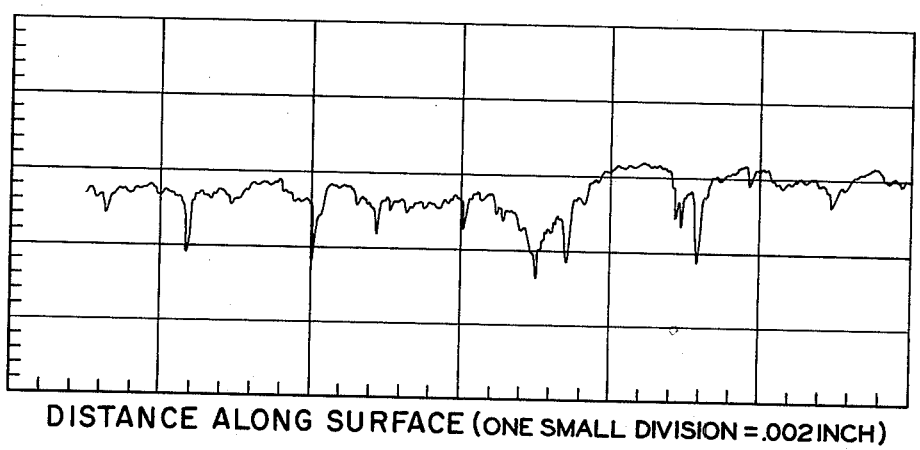
FIGS. 4 and 5 are charts depicting the surface condition respectively of a prior art ground and bright tumbled insert and an insert having a surface conditioned according to the invention.
Figure 5:
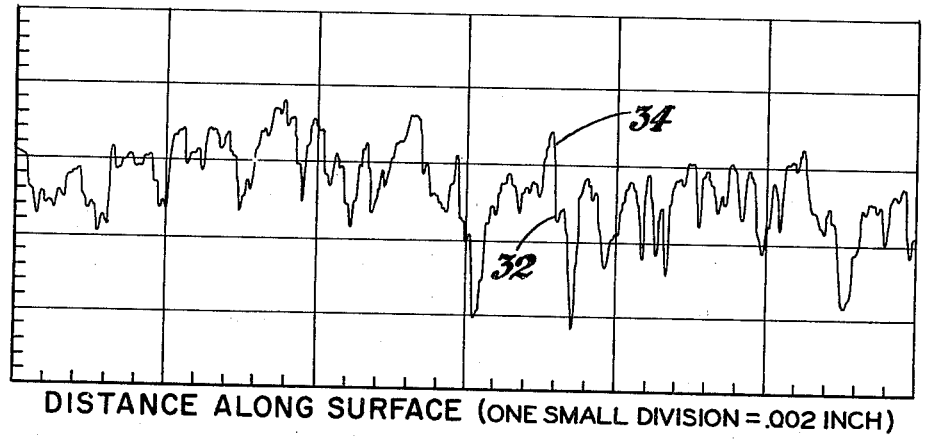

The above described surface treatment produces surfaces that are randomly roughened to a maximum value of asperity, which is smaller than that obtained formed by grinding, to a minimum value, which is larger than the mat finish obtained by abrading with aluminum oxide. This range of roughness may be visualized with reference to FIGS. 4 and 5, which are taken from charts produced through use of a diamond tipped stylus having a rounded tip with a 0.0005 inch radius. FIG. 4 shows the surface condition detected by moving the stylus across the surface of a prior art, ground and bright tumbled insert. FIG. 5 shows the surface condition of an insert having a surface condition produced according to the invention. It may be seen in FIG. 5 that from any lineal surface distance of at least 0.010 there are at least three general asperities which from peak-to-trough measures at least 0.001 inch long (measured along the horizontal axis). There are usually minor asperities seen in one general asperity, as for example the minor asperity 32 seen in the general asperity 34 of FIG. 5.

Figure 3:
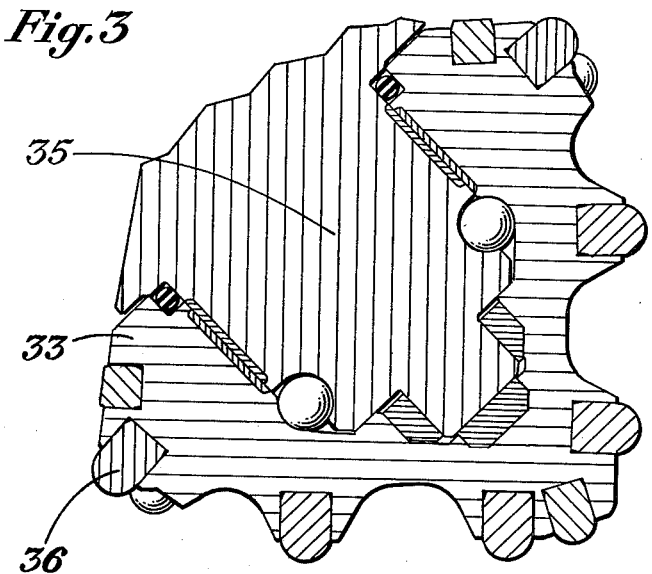
FIG. 3 is a fragmentary sectional view of a rolling cone cutter with sintered tungsten carbide inserts used as earth disintegrating teeth.

The invention is also applied to inserts 36 (FIG. 3) used in interferringly sized holes in a rolling cutter 33 supported on a bearing pin 35 of a rotary cutter drill bit. A typical prior art insert arrangement and bearing configuration are shown.

Utilization of the invention produces unexpected results in improved insert retention and reduced frequency of insert breakage. The force required to press an insert into a hole is increased by as much as 100 percent in laboratory tests. The press-out force is increased by as much as 50 percent. Field test showed a significant decrease in the number of inserts which fractured during earth drilling.

The particular abrasive particle may be varied if hardness is sufficient. From page 61 of the Metals Handbook, 1948 Edition, The American Society for Metals, appears the following table:

Table I

| Relative Abrasive Action of Diamond and Similar Substances on Sintered Carbide. | |
|---|---|
| Diamond dust on sintered carbide | 1000 |
| Boron carbide on sintered carbide | 600 |
| Boron on sintered carbide | 480 |
| Silicon carbide on sintered carbide | 220 |
| Aluminum oxide on sintered carbide | 40 |

In addition, that same page of the same publication provides the following table:

Table II

| Knoop Indentation Hardness of Materials Harder Than a Mohs' Hardness of 8. | |
|---|---|
| Material | Hardness, kg. per sq. mm |
| Diamond | 6000-6500 |
| Sapphire | 1600-2200 |
| Boron Carbide | 2250-2260 |
| Silicon Carbide | 2130-2140 |
| Aluminum Oxide | 1635-1680 |
| Tungsten Carbide plus Cobalt Binder (cemented carbide) | 1050-1500 |

The aluminum oxide produces a surface that is too smooth, having the "mat" appearance previously discussed. The harder particles produce a surface that significantly improves retention and decreases the frequency of insert breakage during earth boring operations. Sapphire is one form of aluminum oxide and has a scratch hardness of 9.0 even though because of its anisotropic property its Knoop indentation hardness may vary as indicated in Table II.

The reason why the invention is successful is not fully understood. It is known that the treatment of the inserts eliminates all sharp corners at the intersection of the bevel 29 (see FIG. 2) and cylindrical surface 25. This, in addition to the rounding of the intersection, minimizes shearing of the surface of a drilled hole upon assembly with the insert. Also, the roughened surface of the insert falls within an upper and a lower limit. The upper limit of roughness, produced by grinding in the prior art, causes shearing of the surface of the hole. The lower limit of roughness, defined by abrading with aluminum oxide particles, is too smooth for effective insert retention, and for unknown reasons, causes a greater frequency of insert breakage. The more firmly an insert is retained, assuming the retaining metal is not stressed excessively, the less likelihood of breakage in operation.

While the invention has been shown and described in only one of its forms, it should be understood that it is not to be thus limited, but is susceptible to various changes and modifications. It's use is not limited, for example, to the preferred geometries and constructions shown and described.

We claim:

1. An improved earth boring tool of the type having at least one sintered tungsten carbide insert with a substantially cylindrical retaining surface interferringly secured to the wall of a retaining hole, the improvement comprising said retaining surface roughened such that in any lineal increment of at least 0.010 inch, there are at least three asperities at least 0.001 inch long and at least 0.00005 inch deep when measured with a stylus point with a 0.0005 inch radius.

2. An improved method of retaining tungsten carbide inserts in an earth boring tool, said method comprising the steps of:
    drilling and reaming a plurality of holes in selected locations on the earth boring tool;
    sintering a plurality of tungsten carbide inserts with a binder selected from the group consisting of cobalt, nickel or iron;
    grinding a substantially cylindrical wall surface on the inserts that are nominally larger in diameter than the drilled and reamed holes;
    roughening the wall surface of the inserts such that any lineal increment of at least 0.010 inch has at least three asperities which are at least 0.001 inch long and at least 0.00005 inch deep when measured with a stylus point with a 0.0005 inch radius;
    and forcing the inserts interferringly into the mating drilled and reamed holes.

* * * * *